Nov. 10, 1970   A. H. BOBECK ET AL   3,540,021
INVERTED MODE DOMAIN PROPAGATION DEVICE
Filed Aug. 1, 1968   4 Sheets-Sheet 1

INVENTORS: A. H. BOBECK
R. F. FISCHER
H. E. D. SCOVIL

BY: Herbert M. Shapiro
ATTORNEY

Nov. 10, 1970          A. H. BOBECK ET AL          3,540,021
           INVERTED MODE DOMAIN PROPAGATION DEVICE
Filed Aug. 1, 1968                              4 Sheets-Sheet 4

United States Patent Office 3,540,021
Patented Nov. 10, 1970

3,540,021
INVERTED MODE DOMAIN PROPAGATION DEVICE
Andrew H. Bobeck, Chatham, Robert F. Fischer, Livingston, and Henry E. D. Scovil, New Vernon, N.J., assignors to Bell Telephone Laboratories, Incorporated, Murray Hill and Berkeley Heights, N.J., a corporation of New York
Filed Aug. 1, 1968, Ser. No. 749,433
Int. Cl. G11c 19/00, 11/14
U.S. Cl. 340—174    12 Claims

ABSTRACT OF THE DISCLOSURE

A single wall domain propagation device operating in an inverted mode is described. Information is represented as the presence and absence of interdomain spacings which are useful over a range of operating parameters different from the range over which single wall domains are useful. The different operating parameters permit the use of more readily available magnetic materials which are relatively easy to tailor to device requirements for information propagation.

FIELD OF THE INVENTION

This invention relates to magnetic domain propagation arrangements and, more particularly, to such an arrangement including a sheet of magnetic material wherein a single wall domain can be propagated.

BACKGROUND OF THE INVENTION

A single wall domain is a magnetic region in which the magnetization is reversed from the surrounding regions of the magnetic material in which the domain is defined. The region is separated from the surrounding regions by a single domain wall corresponding to the interdomain transition regions thereabout. The geometry of the domain wall is primarily a function of the material parameters. Inasmuch as that geometry is independent of the physical boundary of the magnetic sheet, multidimensional movement of single wall domains in the sheet is permitted. The properties and some device applications of single wall domains are described in the Bell System Technical Journal, volume 46, No. 8, October 1967.

A variety of materials are useful as magnetic media for the propagation of single wall domains. The rare earth orthoferrites, for example, are suitable. These materials are characterized by a high uniaxial anisotropy substantially normal to the plane of a sheet thereof suitable for the propagation of single wall domains.

The movement of a single wall domain in a sheet of siutable material is realized conveniently by the generation in the material of a localized attracting field offset from the position occupied by the domain. Let us adopt the convention that a suitable sheet of material has an easy axis normal to the plane of the sheet and that flux directed into the plane along that axis is represented by a minus sign while flux directed out of the plane is represented by a plus sign. In this context, a single wall domain may be represented as an encircled plus sign where the circle represents the single domain wall encompassing the domain. An attracting field, then, is a localized positive field offset from a position occupied by a domain and is conveniently generated, for domains of cylindrical (viz., circular) geometry, by a current flowing in a conducting loop deposited on the surface of the sheet. The domain "sees" a field gradient and moves to a least energy position in response.

One mode of operation with single wall domains employs a bias field which sets constant the diameter of single wall domains in a sheet of magnetic material. A bias field is directed normal to the plane of the sheet and is of a polarity to contract domains. The field is essentially uniform in the material and is conveniently generated by currents in an electrically conducting coil encompassing the sheet and lying in the plane of the sheet or, alternatively, by an appropriately placed permanent magnet. The bias field is of relatively low intensity and serves only to stabilize the domain diameter permitting movement of the domains as stable entities.

Information is represented as the presence and absence of single wall domains moving synchronously from input to output positions in a domain propagation channel. For achieving synchronous movement of domains in a domain pattern, localized fields are generated in consecutively offset patterns to "attract" those domains representative of stored information to consecutive positions each closer to an output position.

The propagation of domain patterns is also achieved in response to a varying bias field which alternately expands and contracts domains in the magnetic sheet. A repetitive asymmetric overlay pattern of soft magnetic material, for example, defines a domain propagation channel in the sheet. The asymmetry of the pattern functions to convert alternate expansion and contraction of domains into net movement toward an output position. Each channel may include thereabout a hairpin conductor which generates a suitably varying bias field only in a selected channel when a current flows therein. In this manner, movement of single wall domains in selected channels is achieved with a relatively simple drive arrangement as disclosed in copending application Ser. No. 710,031, filed Mar. 4, 1968 for A. H. Bobeck and R. F. Fischer.

Single wall domains have been observed in materials such as the rare earth iron garnets which do not have high uniaxial anisotropy. But the domains are stable over such narrow operating ranges that practical use is precluded. Materials, such as the garnets, with low uniaxial anisotropy, on the other hand, are readily available in commercial quantities whereas materials such as the orthoferrites with high uniaxial anisotropy are not so readily available. Moreover, garnet crystals with diverse magnetizations are easily fabricated thus permitting greater flexibility in device design.

BRIEF DESCRIPTION OF THE INVENTION

This invention is based on the realization that operation in an "inverted mode" is realized with a range of operating conditions different from and wider than the range corresponding to operation with single wall domains. The different operating range permits the use of more readily available relatively low uniaxial anisotropy materials.

The term "inverted mode" characterizes a mode of operation inverted from the normal mode and is understood most easily in terms of that normal mode. Let us consider an illustrative domain propagation channel defined by a repetitive overlay pattern of soft magnetic material such as permalloy overlying a sheet of magnetic material. Assume that a hiarpin conductor encompasses the channel. Single wall domains are normally introduced at the mouth of the hairpin conductor for synchronous movement to the terminus of the channel where a suitable detector registers the presence or absence of domains. The normal mode of operation, then, comprise the synchronous movement of patterns of spaced apart domains in a propagation channel.

The term "inverted mode" defines an operation wherein domains are introduced to fill all available positions in the illustrative channel limited only by interactions between next adjacent domains. In this mode of operation, a relatively high bias field is generated. The bias field, in this instance, is of a polarity to expand domains rather than to contract domains as is the case in the normal mode of operation. The domains, under the influence of the bias field, push against one another defining therebetween an interdomain spacing of, ideally, zero width. It has been found that the smaller the interdomain spacing, the smaller the separation between interdomain spacings leading to relatively high packing densities. The presence and absence of interdomain spacings are representative of a binary one and a binary zero, respectively, and can be propagated in a propagation channel much as single wall domains.

Interdomain spacings have been found to be stable over ranges of operating parameters significantly wider than single wall domains in a given material. For example, the diameter of a single wall domain is stable over a range of from one to three times the diameter at which a domain collapses in that material. An interdomain spacing, on the other hand, may be stable in the same material from three times the collapse diameter to much less than 0.1 times that diameter. The greater range for stable spacings, of course, corresponds to a greater range of operating parameters thus permitting use of a wider variety of materials as already indicated.

DETAILED DESCRIPTION

Figure 1:
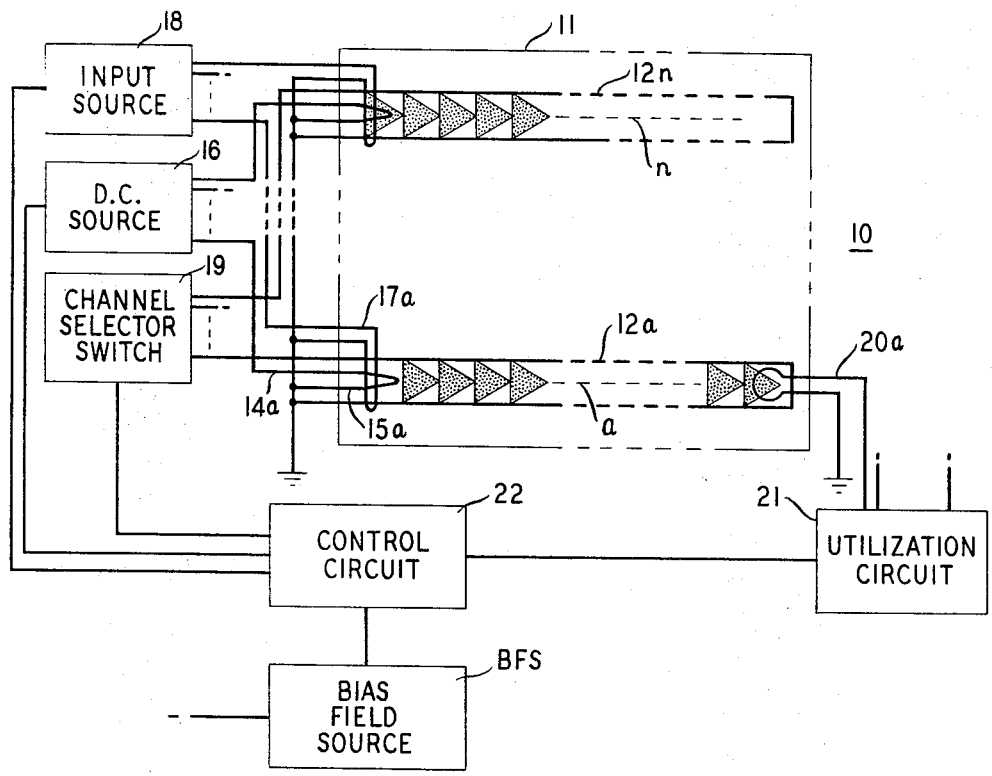
FIG. 1 is a schematic illustration of a propagation arrangement in accordance with this invention.

FIG. 1 shows an illustrative arrangement 10 in accordance with this invention. The arrangement includes a sheet 11 of magnetic material in which single wall domains and thus interdomain spacings can be moved. Hairpin conductors 12a, . . . , 12n, encompass channels for single wall domains and interdomain spacings in sheet 11. The propagation channels a, . . . , n, are defined illustratively by wedge-shaped permalloy overlays arranged in a repetitive pattern between associated input and output positions as shown in FIG. 1 fully for channel a only.

The input position for a channel is defined, as shown for channel a, by a conductor 14a which outlines an area (viz., stationary domain) 15a of sheet 11 adjacent the leftmost terminus (mouth) of channel a in FIG. 1. When a current flows in conductor 14a, domain walls in sheet 11 to either side of the conductor move until the material to each side of the conductor is saturated magnetically in directions determined by the polarity of the current. For the convention adopted, the area 15a is of positive magnetization and the polarity for current in conductor 14a is negative, accordingly. Conductor 14a is connected to a D-C source 16 to this end. A hairpin conductor 17a overlies area 15a in a manner to divide that area, as shown in the figure. Conductor 17a serves to sever a portion of area 15a from the remainder when pulsed. The so-severed portion becomes a single wall domain for propagation. The original shape of area 15a is reconstituted by the current in conductor 14a when the current in conductor 17a terminates. Conductor 17a is connected between an input source 18 and ground.

For the convention adopted, a positive current in conductor 17a operates to sever the portion of area 15a. It may be appreciated from FIG. 1 that a current in conductor 17a, and so poled, generates a negative field into the plane of sheet 11 between the legs of the conductor. The field outside either leg of the conductor is positive. A portion of area 15a thus separates in response to such a current, the severed portion of that area forming a single wall domain for propagation in the associated channel.

Figure 2A:
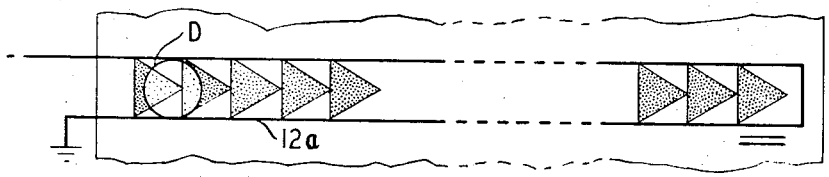
FIGS. 2A, 2B, 2C, 2D, 2E, 3–7, and 8A–8E are schematic illustrations of portions of the arrangement of FIG. 1 showing consecutive magnetic configurations therein.
Figure 2B:
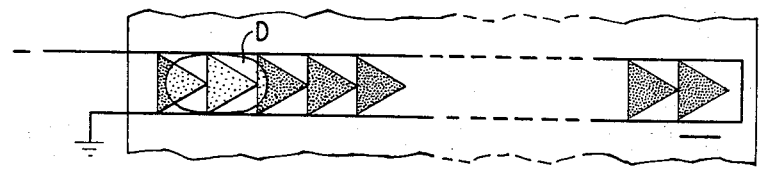
Figure 2C:
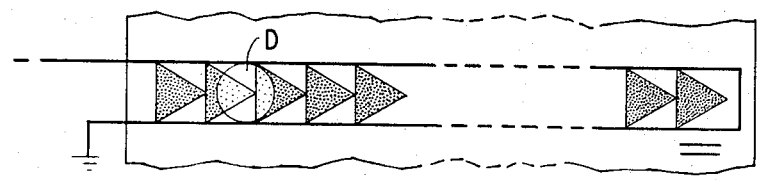
Figure 2D:
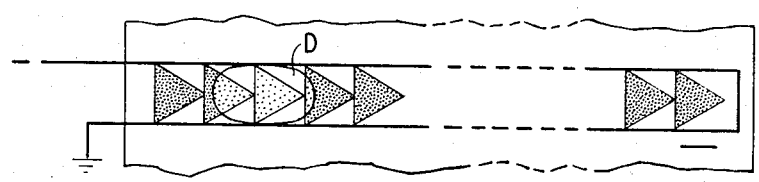
Figure 2E:
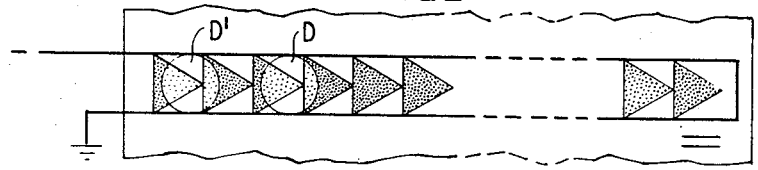

The illustrative implementation for moving single wall domains in sheet 11 includes the asymmetrical triangular or wedge-shaped overlay pattern of channel a, shown in FIG. 2A. The normal propagation operation for single wall domain propagation with this implementation is now described. The intensity of the bias field in each cycle of the propagation operation is indicated by the minus signs in the lower right corner of each of FIGS. 2A–2E. A double minus sign, as shown in FIG. 2A, indicates a relatively high bias field. A single minus sign, as shown in FIG. 2B, indicates a relatively low bias field. A single wall domain is contracted in the presence of the relatively high bias field in the normal mode of operation. This is shown in FIG. 2A. The domain is expanded in the presence of the relatively low bias field as shown for domain D in FIG. 2B. Successive contraction and expansion of domain D results in an advance of the domain to the right as shown in FIGS. 2A through 2D. In FIG. 2E, domain D is further advanced, again in a contracted state, and in a position so that a second domain D' (or absence thereof) may be introduced without interaction therewith.

Figure 3:
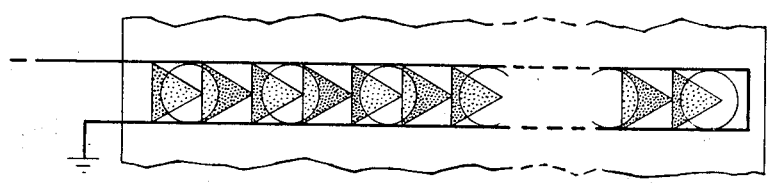

The same propagation implementation may be used in accordance with this invention for the movement of interdomain spacings except that the polarity of the bias field is reversed. Each consecutive domain introduced at an input position in such a channel is expanded by the bias field to occupy the entire channel constrained only by the preceding domains. A starting condition, accordingly, comprises a fully occupied channel where every possible position in the channel includes a domain. The condition is realized, as above, by introducing consecutive domains into a channel until additional domains can no longer be added and is illustrated in FIG. 3. The geometry of each domain, under the instant bias condition, is maintained constant by interaction with next adjacent domains. The geometry of the permalloy wedges shown in FIG. 3 is chosen to be consistent with the desired domain geometry.

Figure 4:
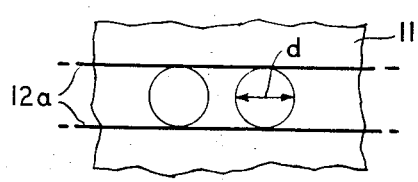
Figure 5:
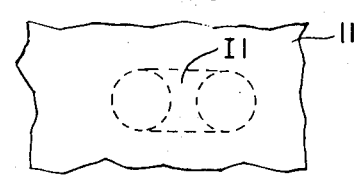

In the inverted mode situation, it is as appropriate to consider information to be represented by the presence and absence of interdomain spacings as by the presence and absence of single wall domains. FIG. 4 shows two neighboring domains in a bias field poled to expand domains. The domains are held apart by interaction forces and constrained by the fields generated by currents in the encompassing hairpin conductor 12a. FIG. 5 shows the interdomain spacing I1 between those two domains. It is helpful to remember that a domain differs from an interdomain spacing only in magnetization direction and that the domain wall therebetween is essentially what is detected as representing information.

Figure 6:
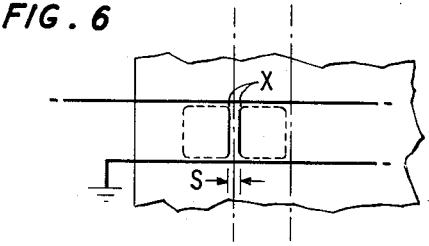
Figure 7:
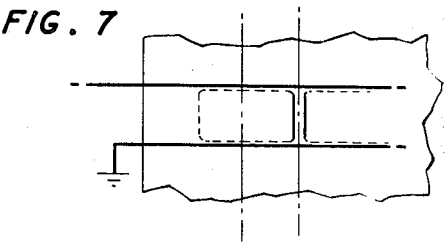

The geometry of the interdomain spacing is determined by the radius of curvature of the defining wall as shown at X in FIG. 6. If the material has a low uniaxial anisotropy, the radius of curvature may be made small when bias fields are high. Ideally, under conditions of low anisotropy and high bias, the interdomain spacing (see FIG. 6) has a zero width $s$ and the diameter $d$ (see FIG. 4) may be made arbitrarily small leading to high packing densities. In this system, an interdomain spacing, as shown in FIG. 6, may be taken to represent a binary "1" whereas the absence of a spacing in a corresponding position, as shown in FIG. 7, represents a binary "0."

Figure 8A:
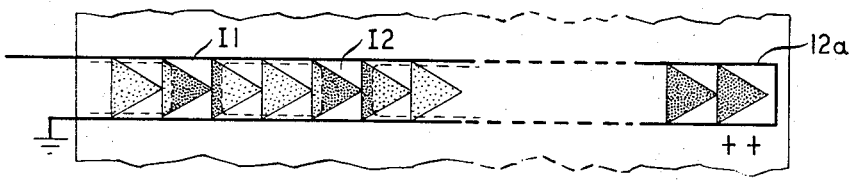
Figure 8B:
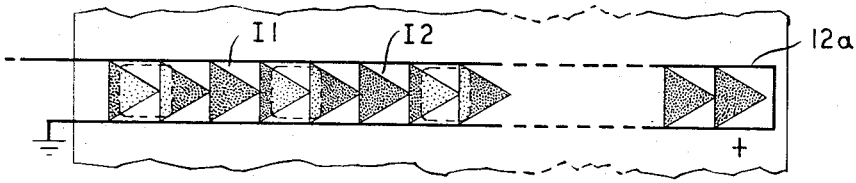
Figure 8C:
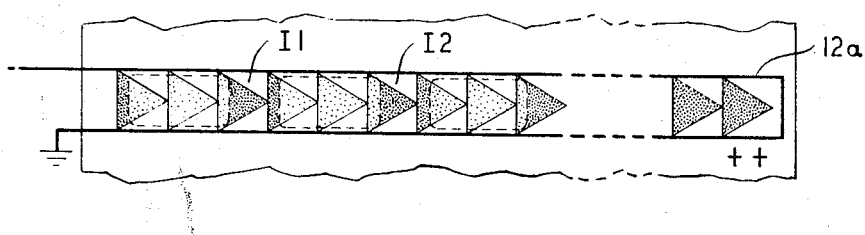

FIGS. 8A–8E show the movement of information represented by interdomain spacing I1 in channel a of FIG. 1 in response to the alternate contraction and expansion of spacings. The field condition for which interdomain spacings contract is represented by a double plus sign, whereas the condition for an expanded spacing is represented by a single plus sign. FIG. 8A shows the contracted condition for a spacing I1. When the bias field becomes less positive, the spacing I expands, as shown in FIG. 8B. The next consecutive contract-expand cycle causes movement of the spacing I1 to the right as is clear from a comparison between FIGS. 8A and 8D.

Figure 8D:
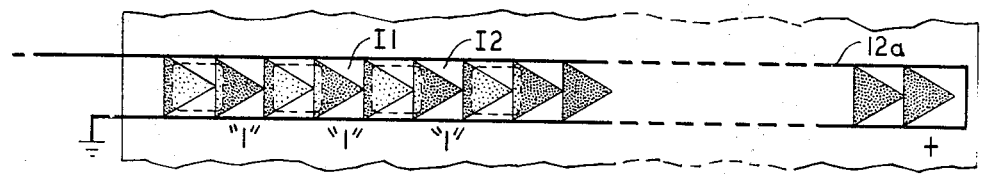
Figure 8E:
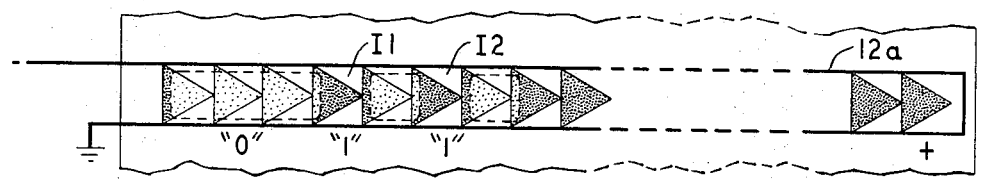

FIGS. 8D and 8E show the advanced position of information 111 and 011 moved in this manner. A comparison between FIGS. 8D and 8E shows that the absence of a spacing corresponds to a binary zero. Consecutive alternations of the bias field move information ultimately to output positions for detection.

Movement of interdomain spacings in a selected channel is carried out in the illustrative arrangement in response to alternating bias field provided by varying currents in a selected hairpin conductor, such as 12a of FIG. 1. Each of the conductors 12a, 12b, . . . , 12n is connected between a channel select switch 19 and ground, as shown in FIG. 1, for channel selection control. Alternatively, a uniform varying bias can be generated by well-known means uniformly throughout sheet 11 causing all interdomain spacings to advance synchronously to associated output positions. A block BFS in FIG. 1 represents a bias field source for synchronous spacing movement.

FIG. 1 shows an illustrative output position for channel a only. Similar output positions are, of course, provided for the remaining channels. The output position is defined by a conductor loop 20a which couples a terminal position in channel a to which interdomain spacings are moved. Conductor 20a detects the presence of spacings when one passes thereby and applies a pulse to utilization circuit 21 in response. It is convenient for utilization circuit 21 to be enabled to receive pulses on conductor 20a each time an interdomain spacing is expanded and circuit 21 is connected to a control circuit 22 for suitable synchronization.

Source 18 and switch 19 or source BFS are, likewise, connected to circuit 22 for synchronization. The various circuits, switches, and sources may be any such elements capable of operating in accordance with this invention.

Figure 9A:
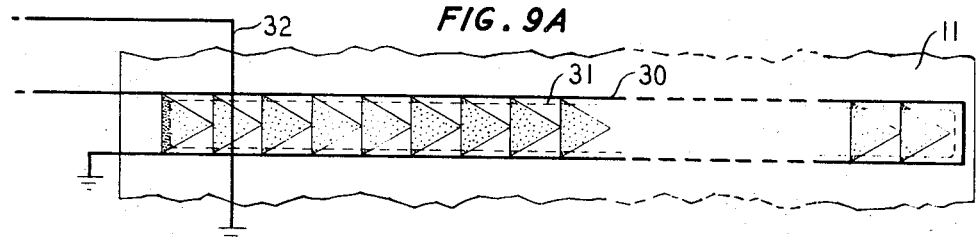
FIGS. 9A, 9B, and 10 are portions of alternative arrangements in accordance with this invention.
Figure 9B:
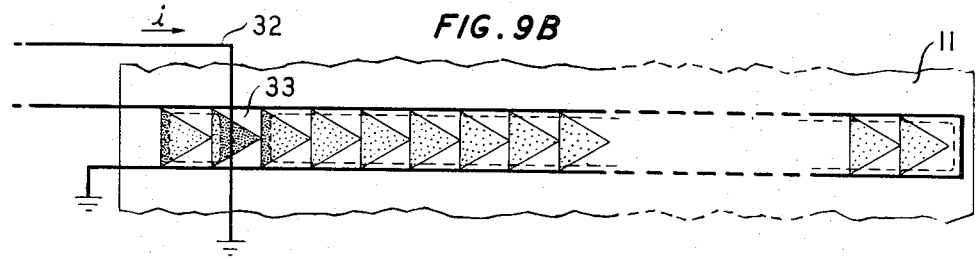

The inverted mode of operation permits a simple alternative arrangement for introducing domain spacings. For example, FIG. 9A shows a propagation channel 30 occupied by one elongated single wall domain 31. A conductor 32 overlies one of the wedges of the overlay pattern defining the channel. Conductor 32 generates a field in accordance with the right-hand rule when pulsed, as indicated by arrow $i$ in FIG. 9B. An interdomain spacing 33 results, even though no additional source of domains is present, for propagation as described in connection with FIG. 1.

A recitation of a specific example of an arrangement in accordance with this invention indicates the utility thereof. A slice of lutecium orthoferrite 2.0 mils thick was operated in the inverted mode for moving 7.0 mil interdomain spacings in a propagation channel defined by magnetically soft permalloy wedges and a hairpin conductor as shown in FIG. 1. The wedges were on 3.5 mil centers and the legs of the airpin were spaced 4.0 mils apart. An expand-contract propagation mode was practiced with bias field variations of $13.0 \pm 3.0$ oersteds. With terbium iron garnet, bias field variations of about $100 \pm 20$ permit the propagation of interdomain spacings of about an order of magnitude smaller with wedges and hairpin conductors of equally reduced dimensions.

The invention has been described in terms of an illustrative domain propagation implementation. But, any propagation implementation useful for moving single wall domains may be adapted for moving interdomain spacings as should be apparent to those skilled in the art. A hairpin conductor may or may not be used with such implementations depending on whether channel selection or synchronous movement in all channels is desired. The constraining of domains to channels can be accomplished in either case by permalloy strips or by interactions with domains in adjacent channels as well as by the hairpin conductors described along with a constant current maintained therein for generating only a constraining bias field.

Figure 10:
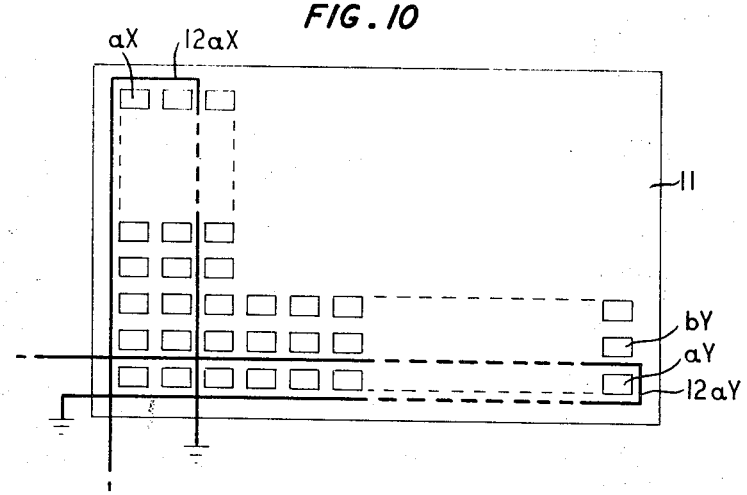

An organization wherein domains are constrained not only by interactions with neighboring domains in a channel but also by interactions with domains in neighboring channels leads to a two-dimensional arrangement of interdomain spacings which appears as a web as shown in FIG. 10.

Interdomain spacings can be moved in X or Y oriented channels in this embodiment. Visualize next adjacent domains packing sheet 11 of FIG. 1 solidly as indicated in FIG. 10. Each domain defines an interdomain spacing with each of the next adjacent domains. If two domains are horizontally disposed with respect to one another, the spacing therebetween is oriented vertically and may be propagated along say channel $aY$. If, on the other hand, next adjacent domains are disposed vertically with respect to one another, the spacing therebetween is oriented horizontally and may be propagated vertically along say channel $aX$ in FIG. 10. Hairpin conductors $12aX$ and $12aY$ may be employed for controlling selective movement.

It is noted that conductor $12aX$ in FIG. 10 illustratively encompasses what would be two channels in the horizontal orientation. In this arrangement, information is introduced to any horizontal channel as discussed in connection with FIG. 1. Vertically oriented hairpin conductors as shown in FIG. 10 are then pulsed (first odd, then even conductors) in parallel for moving information in say channel $aY$ to a next adjacent channel $bY$. If an expand-contract propagation mode is employed, permalloy wedges for horizontal movement along with associated hairpin conductors may be disposed on one surface of sheet 11 while the wedges and hairpin conductors for vertical movement may be disposed on the other surface of sheet 11.

It is to be understood that what has been described is merely illustrative of the principles of this invention and that numerous other arrangements in accordance with this invention may be devised by one skilled in the art without departing from the spirit and scope thereof.

What is claimed is:

1. An information propagating arrangement comprising a sheet of magnetic material in which single wall domains can be propagated, means for defining in said sheet a plurality of propagation channels for single wall domains, means for confining single wall domains to said channels, means for moving single wall domains in said channels, and means for generating selectively throughout in each of said channels a uniform bias field of a polarity to expand domains.

2. An arrangement in accordance with claim 1 wherein said sheet of magnetic material is characterized by a preferred direction of magnetization substantially normal to the plane of said sheet.

3. An arrangement in accordance with claim 2 including means for providing single wall domains in said propagation channels selectively, and means for detecting the presence of interdomain spacings between next adjacent domains in said channels.

4. An arrangement in accordance with claim 2 wherein said means for moving comprises means for alternately expanding and contracting domains in selected channels.

5. An arrangement in accordance with claim 4 wherein said means for alternately expanding and contracting domains in selected channels comprises an electrical conductor encompassing each of said channels and means for selectively driving said conductors in a manner to alternately expand and contract domains therein.

6. An arrangement in accordance with claim 2 wherein said means for defining propagation channels comprises a repetitive pattern of soft magnetic material overlying said sheet.

7. An information propagating arrangement comprising a sheet of magnetic material in which single wall domains can be propagated, means for defining in said sheet a plurality of propagation channels for single wall domains alternately expanded and contracted in said sheet, means for generating selectively throughout said channels a uniform bias field of a polarity to expand domains, and means for alternately expanding and contracting domains in said sheet.

8. Apparatus comprising a sheet of material having a preferred direction of magnetization substantially normal to the plane of said sheet, means for selectively providing in said sheet single wall domains defining interdomain spacings therebetween, and means for moving interdomain spacings in said sheet, said last-mentioned means comprising means for defining propagation channels for interdomain spacings, and means confining said spacings to said channels, said apparatus also comprising means for detecting the presence and absence of interdomain spacings in said sheet and means for generating in said sheet a bias field of a polarity to expand said domains therein.

9. Apparatus in accordance with claim 8 wherein said means for defining propagation channels comprises wedges of soft magnetic material overlying said sheet.

10. Apparatus in accordance with claim 9 wherein said means for confining comprises a conductor encompassing said wedges and means for applying pulses to said conductor to generate a field for confining said spacings.

11. Apparatus in accordance with claim 10 also including means for generating in said sheet fields for alternately contracting and expanding said spacings.

12. Apparatus in accordance with claim 8 wherein said means for defining propagation channels comprises means defining propagation channels having intersections therebetween.

References Cited

UNITED STATES PATENTS

| | | | |
|---|---|---|---|
| 3,068,153 | 12/1962 | Broadbent | 340—174 |
| 3,248,713 | 4/1966 | Middelhoek | 340—174 |
| 3,438,016 | 4/1969 | Spain | 340—174 |
| 3,460,116 | 8/1969 | Bobeck et al. | 340—174 |
| 3,191,054 | 6/1965 | Ghisler et al. | 307—88 |

STANLEY M. URYNOWICZ, JR., Primary Examiner